United States Patent
Ong

(10) Patent No.: US 6,594,323 B1
(45) Date of Patent: Jul. 15, 2003

(54) METHOD AND APPARATUS FOR INTEGRATING ISOCHRONOUS AND ASYNCHRONOUS COMMUNICATION IN A NETWORK

(75) Inventor: Chung-Yen Ong, Norcross, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/411,593

(22) Filed: Oct. 4, 1999

(51) Int. Cl.⁷ .............................. H03D 1/00; H04Q 7/20
(52) U.S. Cl. ........................ 375/340; 455/450
(58) Field of Search ................ 375/130–350; 360/29–71

(56) References Cited

U.S. PATENT DOCUMENTS

| | | | |
|---|---|---|---|
| 3,956,589 A | * | 5/1976 | Weathers et al. ............ 370/276 |
| 5,625,889 A | * | 4/1997 | Chikkaswamy et al. ... 455/67.1 |
| 5,666,378 A | * | 9/1997 | Marchetto et al. .......... 370/352 |
| 5,761,465 A | * | 6/1998 | Nimishakvi et al. ........ 375/229 |
| 6,125,135 A | * | 9/2000 | Woo et al. ................... 710/316 |
| 6,243,224 B1 | * | 6/2001 | Sacks et al. ................. 375/343 |

* cited by examiner

*Primary Examiner*—Stephen Chin
*Assistant Examiner*—Lawrence Williams

(57) ABSTRACT

The present invention provides a method and an apparatus for providing a multiple access isochronous network that is capable of accommodating isochronous and asynchronous traffic. In accordance with the present invention, a non-zero thresholding mechanism is utilized at the receivers of the receiver/transmitter pairs communicating over the network to determine whether a given sub-channel is idle, or whether the receive buffer of a receiver operating in the receive mode is to be updated with a binary 0 or a binary 1. Utilizing the non-zero thresholding mechanism allows for the possibility that nothing is being sent over a particular sub-channel during one or more symbol periods. Utilizing the non-zero thresholding mechanism enables asynchronous and isochronous transport to occur on an isochronous framework without the need for stuffing bits onto the channel. Signals received over a sub-channel are demodulated and correlated to generate correlation results. Each correlation result is compared to a non-zero threshold to determine whether sufficient energy exists on the channel to indicate that a bit decision should be made. If insufficient energy exists on the sub-channel to warrant performing a bit decision, then the channel is deemed to be idle and no bit decision is performed. If sufficient energy exists on the sub-channel to warrant performing a bit decision, then the channel is deemed not to be idle and a bit decision is performed.

20 Claims, 3 Drawing Sheets

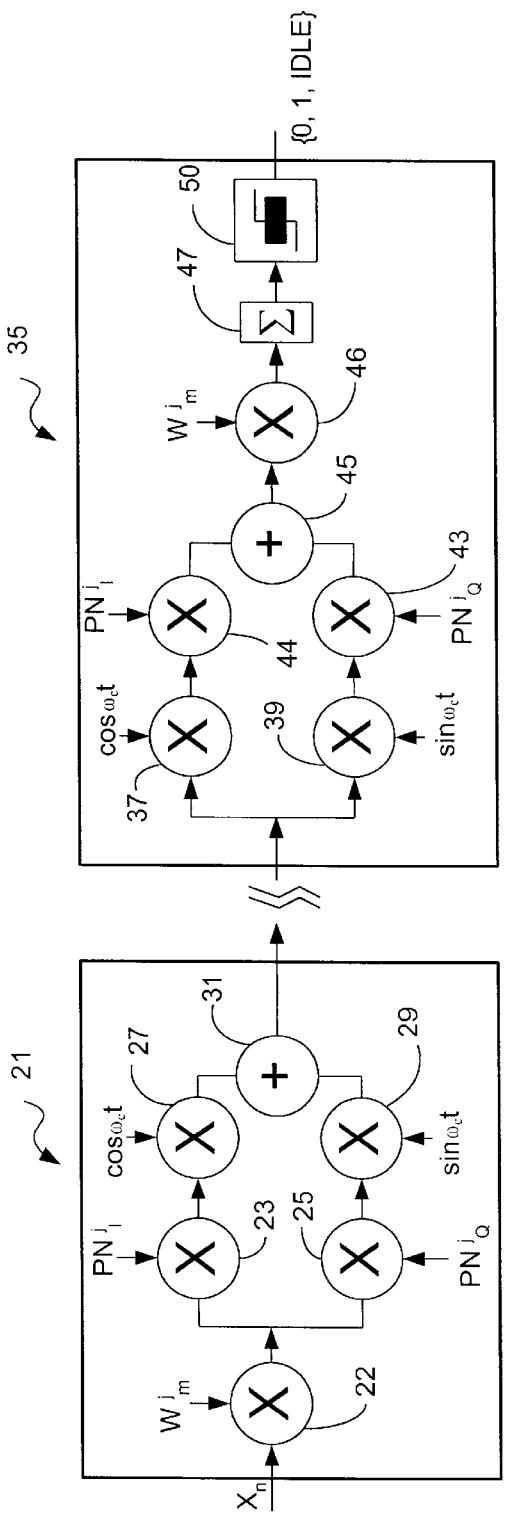
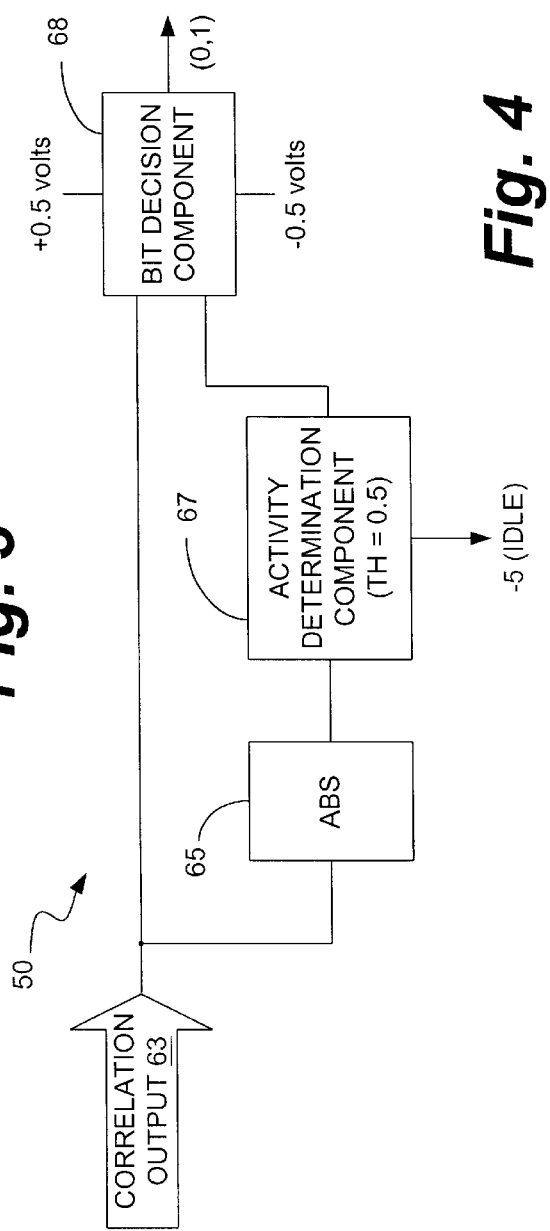
Fig. 3
Fig. 4

METHOD AND APPARATUS FOR INTEGRATING ISOCHRONOUS AND ASYNCHRONOUS COMMUNICATION IN A NETWORK

TECHNICAL FIELD OF THE INVENTION

The present invention relates to a method and apparatus for integrating isochronous and asynchronous communication capability in a network and, more particularly, to a method and apparatus for utilizing a non-zero thresholding technique to enable isochronous and asynchronous information to be communicated over a network.

BACKGROUND OF THE INVENTION

The challenge of providing integrated (i e., shared bandwidth) multiple media access lies in accommodating potentially disparate needs of various traffic types. For instance, voice communication often is characterized as isochronous because it utilizes a constant bit rate, presenting data to the channel at fairly regularly spaced intervals in evenly distributed amounts. On the other hand, data communication is generally characterized as asynchronous because it is bursty or widely varying in bit rate, occupying the channel at random intervals for un-prescribed lengths of time.

Integrating different modes of communication in a common framework offers numerous advantages. For example, integration:allows load balancing to be utilized to accommodate periodic shifts in service demand. Load balancing provides the ability to accommodate more voice traffic during commute/drive times and more data traffic during work and evening hours. Integration also enables phased introduction of service capabilities, i.e., it allows the service provider to leverage investment initially made for one purpose against new revenue opportunities as they emerge. Integration also facilitates hedging, or in other words, providing the ability to grow capacity in one market in the event that another market declines or fails to materialize.

Past attempts have been made to accommodate isochronous traffic on an asynchronous framework, such as voice over Internet Protocol (VoIP). However, such attempts have produced mixed results. The greater the channel capacity is relative to the traffic demand, the more capable an asynchronous framework is in accommodating isochronous traffic. As bandwidth demand increases, isochronous traffic suffers from the inadequacies of asynchronous transport, particularly its inconsistent delay characteristics. Therefore, the success of such attempts has been largely dependent on the channel load relative to capacity.

Likewise, a conventional multiple access arrangement, such as a code division multiple access (CDMA) arrangement, that is constructed on an isochronous framework compromises the quality of high-speed data services. The greater the channel capacity is relative to the traffic demand, the more capable the isochronous framework is in accommodating asynchronous traffic. However, as bandwidth demand increases, asynchronous traffic suffers from the inadequacies associated with using isochronous transport for asynchronous traffic.

The requirements for integrated multimedia extend beyond simply providing sufficient throughput to accommodate different traffic types in a manner best suited to the multiple access framework. The challenge also lies in adapting the framework to provide transport in a manner deemed viable and satisfactory across a range of service requirements.

In a conventional CDMA isochronous framework, users are separated on the channel by Walsh codes. The Walsh codes are a set of codes that are generated using a time-orthogonal Walsh function. During call set up, the user's communication device is assigned a Walsh code. This Walsh code is then utilized by the receiver of the user's communication device and by the transmitter of the base station to communicate. Therefore, the users communicating over a particular channel utilize the same frequency, but are separated on the channel by the Walsh codes. Each Walsh code being utilized on a particular channel corresponds to a separate sub-channel. The transmissions from the base stations to the mobile stations are modulated with the Walsh codes. At the receiver of the mobile station, bit decisions are made by a zero thresholding mechanism at the output of a correlator. The correlator correlates the received symbols and outputs a correlation value. The zero thresholding mechanism evaluates the correlation value to determine whether a binary 1 or a binary 0 was received.

Specifically, if the correlator output falls below a preselected zero threshold value, meaning that the correlator output is negative, a binary 0 is output to the receive buffer. If the correlator output is above the preselected zero threshold value, meaning that the correlator output is positive, a binary 1 is output to the receive buffer. Alternatively, a negative correlation value may correspond to a binary 1 and a positive correlation value may correspond to a binary 0, depending on how bits are mapped to the signal level on the channel.

This type of zero thresholding mechanism is satisfactory for isochronous communication, such as voice communication, because isochronous information is sent continuously at a constant bit rate. Therefore, a given sub-channel is always occupied during a given frame period. Consequently, the receive buffer should always be receiving either a binary 0 or a binary 1 during a given frame period. However, a zero thresholding mechanism is not well suited for asynchronous transport because data is not always being sent over a given sub-channel. As stated above, asynchronous traffic can vary in bit rate and can occupy the sub-channel at random intervals for un-prescribed lengths of time. Therefore, a given sub-channel is not always occupied. Utilizing a zero thresholding mechanism in this environment can result in the receive buffer being updated even when there is no data being sent, which can result in the receive buffer being updated with erroneous information.

One solution to the problems associated with using zero thresholding in an isochronous network being used to transmit asynchronous traffic is to "stuff" the channel with bits that indicate when no data is being sent. However, in a CDMA isochronous network, multiple users are using the same frequency to transmit data over several sub-channels that are separated on the channel by the Walsh codes. Each sub-channel contributes some degree of noise to the other sub-channels. Stuffing bits onto the sub-channels contributes noise to the network, thus adversely affecting the signal-to-noise ratio (SNR) of the network.

Accordingly, a need exists for an isochronous framework that is capable of accommodating isochronous and asynchronous traffic in a manner that meets the throughput requirements for all types of traffic, while efficiently sharing channel resources.

SUMMARY OF THE INVENTION

The present invention provides a method and an apparatus for providing a multiple access isochronous network that is capable of accommodating isochronous and asynchronous traffic. In accordance with the present invention, a non-zero thresholding mechanism is utilized at the receivers of mobile stations communicating over the network to determine whether a given sub-channel is idle, or whether the receive buffer of an active sub-channel is to be updated with a binary 0 or a binary 1. Utilizing the non-zero thresholding mechanism allows for the possibility that nothing is being sent over a particular sub-channel during one or more symbol periods. Utilizing the non-zero thresholding mechanism enables asynchronous and isochronous transport to occur on an isochronous framework without the need for stuffing bits onto the channel.

Each receiver of a mobile station communicating over the network comprises a correlator that correlates the incoming symbols and outputs correlation results. These correlation results are analyzed by the non-zero thresholding mechanism. In accordance with the present invention, the non-zero thresholding mechanism first determines whether sufficient energy has been detected on the sub-channel to indicate that a binary 1 or 0 possibly was sent. In order to accomplish this, a first, non-zero threshold value is compared to the correlation result. If the absolute value of the correlation output does not exceed the first non-zero threshold value, then a determination is made that the sub-channel is idle.

If the absolute value of the correlation output exceeds the first, non-zero threshold value, then a determination is made as to whether the correlation output corresponds to a binary 0 or a binary 1. A relatively large negative result at the correlator output, i.e., a result that has a greater negative value than a second, negative threshold value, is interpreted by the non-zero thresholding mechanism as a binary 0. A binary 0 is then passed along to the receive buffer as a valid data entry. Similarly, a relatively large positive result, i.e., a result that has a greater positive value than a third, positive threshold value, is interpreted by the non-zero thresholding mechanism as a binary 1. A binary 1 is then passed along to the receive buffer as a valid data entry.

The present invention utilizes the fact that a relatively low-energy non-zero result at the correlator output presumably corresponds to the Walsh code of that particular sub-channel being absent for a given symbol period. The correlation result is not equal to zero due to interference on the sub-channel contributed by other users of the network. In other words, relatively low energy on the sub-channel corresponds to no information having been sent, rendering that particular sub-channel idle for the associated symbol period. Correspondingly, no update occurs at the receive buffer until data transmission resumes. When data transmission resumes, it will be evidenced by substantial energy, either positive or negative, at the correlator output relative to the non-zero threshold.

By using the non-zero thresholding mechanism in this manner, an isochronous network may be used for communicating both isochronous and asynchronous types of traffic, without the need for stuffing bits onto the sub-channels and without degrading the signal-to-noise ratio of the network. These and other features and advantages of the present invention will become apparent from the following description, drawings and claims.

BRIEF DESCRIPTION OF THE DRAWINGS

FIG. 3 is a block diagram functionally illustrating a modem of a transmitter and a modem of a receiver that are used for transmitting and receiving, respectively, signals over a network such as that shown in FIG. 1.

FIG. 4 is a block diagram illustrating the functional components of the non-zero thresholding mechanism of the present invention in accordance with the preferred embodiment.

DETAILED DESCRIPTION OF THE INVENTION

Figure 1:
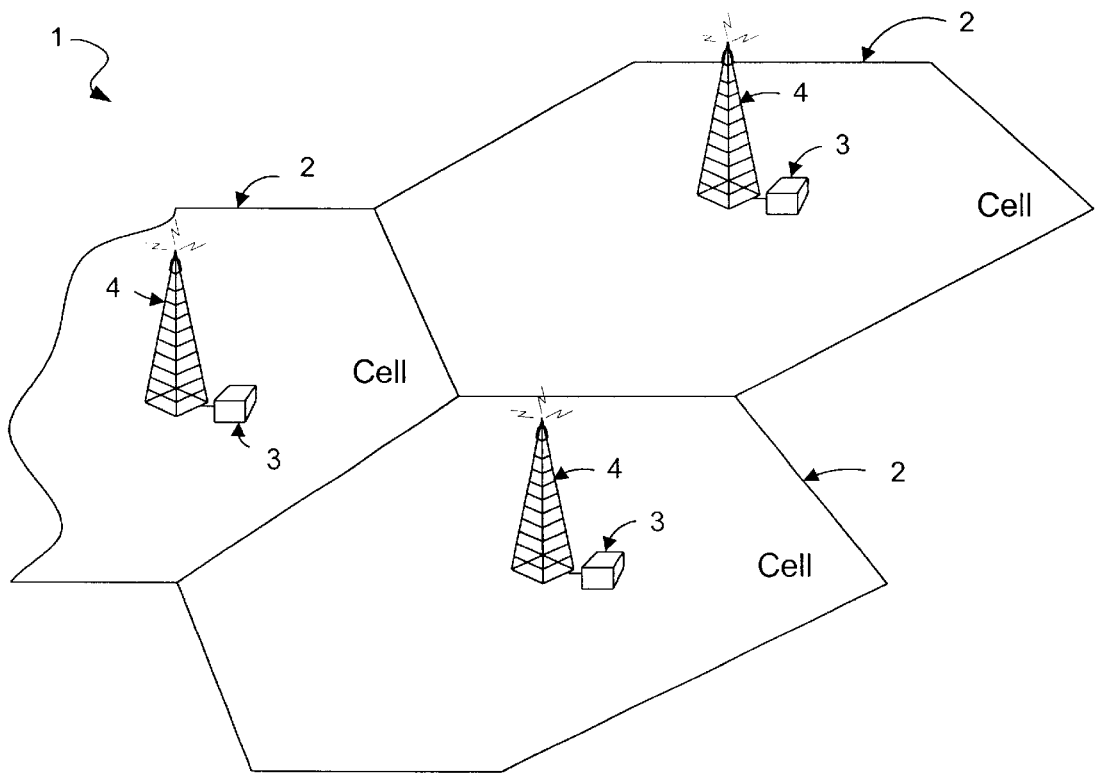
FIG. 1 illustrates a wireless network with which the non-zero thresholding method and apparatus of the present invention may be utilized.

FIG. 1 is an illustration of a typical multiple access wireless network in which the present invention may be implemented. The present invention is not limited to use with wireless networks such as that shown in FIG. 1. Rather, the network 1 shown in FIG. 1 is being discussed herein for exemplary purposes and the present invention should not be construed as being limited to this type of network. The wireless network 1 comprises a plurality of cells 2, each of which comprises a transmitter/receiver 3 that is electrically coupled to an antenna 4. Each transmitter/receiver 3 and its respective antenna 4 together comprise a base station. Each of the cells 2 is associated with a particular wavelength, or channel, that is utilized for communicating over the particular cell 2.

In each of the cells 2, users are assigned Walsh codes for transmission within the cell. During call setup, the user initiating the call is assigned a particular Walsh code that is utilized during the call to identify the user. Therefore, the transmitter at the base station and the receiver of the user's communication device (not shown) utilize a particular Walsh code for transmission and reception of signals within the cell 2.

Figure 2A:
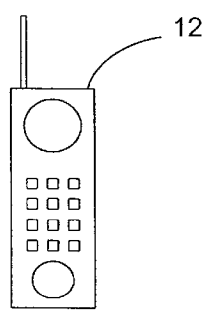
FIG. 2A illustrates a typical cellular telephone that may be utilized to communicate voice information over the network shown in FIG. 1.
Figure 2B:
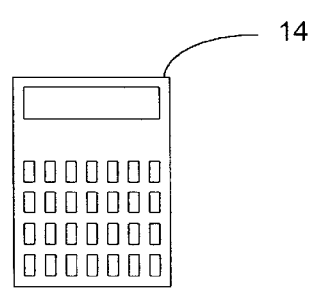
FIG. 2B illustrates a typical handheld personal communicator capable of transmitting voice and/or data over the network shown in FIG. 1.

FIG. 2A and FIG. 2B are pictorial representations of two typical communication devices that may be utilized by users to communicate over the network 1 shown in FIG. 1. The communication device 12 is a typical cellular telephone that may be utilized to communicate voice information over a multiple access network, such as that shown in FIG. 1. The communication device 14 is a handheld personal communicator capable of transmitting voice and/or data over a multiple access network, such as that shown in FIG. 1.

The non-zero thresholding method and apparatus of the present invention are suitable for use in any type of network that utilizes a shared bandwidth for allowing users to communicate over the network. The network shown in FIG. 1 is a typical wireless network that utilizes the well-known code division multiple access (CDMA) standard to communicate over the network. A CDMA network utilizes a common wavelength for multiple users and each of the users is separated on the channel by different Walsh codes. The present invention is also suitable for use in a time division multiple access (TDMA) network in which multiple users utilize a common wavelength for communication and each transmission over the network occurs within an allotted timeslot. Therefore, a TDMA network also utilizes a shared bandwidth for multiple users and each transmission is allotted a timeslot.

The present invention is also suitable for use in a wireless local area network (LAN). Wireless LANs utilize what is commonly referred to as a spread spectrum for communication over the network. This type of network utilizes a code word that is similar to the Walsh code utilized in CDMA networks for communication. However, the code words utilized in a wireless LAN network are not utilized to identify the users. Rather, the code words are utilized to determine when information is actually being transmitted over the network. As in CDMA networks, in a wireless LAN, energy can exist on the channel even when no information is being sent. Therefore, the code words utilized in wireless LAN networks are utilized for the purpose of determining when energy on the channel actually corresponds to information being sent. The non-zero thresholding method and apparatus of the present invention are suitable for use in all of these types of networks.

FIG. 3 is a block diagram of a transmitter 21 of a modem utilized for transmitting information over a network and a receiver 35 of a modem utilized for receiving information transmitted over the network. The transmitter 21 may be, for example, the transmitter of a transmitter/receiver comprised by a modem located at the base station associated with a particular cell. The transmitter 21 receives a bit stream $X_n$ that corresponds to symbols to be transmitted over the network 1 by the transmitter 21. The transmitter 21 comprises a modulation component 22 that receives the bit stream and modulates each bit of the bit stream with a $j^{th}$ bit of an $m^{th}$ Walsh code. As stated above, each user is assigned a particular Walsh code. The modulated bit stream is then provided to modulation components 23 and 25, which modulate them with the $J^{th}$ bits of pseudo-random number (PN) codes $PN_I$ and $PN_Q$, which are associated with the base station.

Once the signals have been modulated by these components, the modulated signals are quadrature amplitude modulated by modulation components 27 and 29, which modulate the signals in the respective branches in such a manner that a 90° phase shift between the signals exists. The manner in which all of these modulation components function is well known to those skilled in the art. Therefore, a detailed discussion of the operations of the modulation components of the transmitter 21 will not be provided herein in the interest of brevity.

The modulated bit streams are then summed by summation component 31 and transmitted over the network. A receiver 35, which may be, for example, the receiver of a modem located in one of the communication devices shown in FIG. 2A or FIG. 2B, receives the signal transmitted by transmitter 21 and demodulates the signal utilizing demodulation components 37, 39, 43, 44 and 46. Once the bit stream from transmitter 21 is transmitted to receiver 35, the bit stream is provided to demodulation components 37 and 39. The demodulation components 37 and 39 remove the 90° phase shifted sinusoidal waves between the received bit streams. The demodulation components 43 and 44 then demodulate the PN code associated with the base station. The demodulated bit streams are then summed by summation component 45 to produce a single bit stream. The bit stream is then demodulated by demodulation component 46, which removes the Walsh code. The demodulated bit stream is then integrated by the summation component 47 and the integrated signal is provided to the non-zero thresholding mechanism 50 of the present invention.

The components 46 and 47 correspond to the correlator of the receiver 35. The correlator performs typical correlation operations and produces correlation results that are provided to the non-zero thresholding mechanism 50 of the present invention. Since the manner in which the correlator operates is well known in the art, a detailed discussion of the manner in which the correlation results are produced will not be provided herein in the interest of brevity.

The non-zero thresholding mechanism 50 of the present invention estimates the sub-channel contents (i.e., binary 0, binary 1 or idle) based on the polarity and magnitude of the correlator output. The non-zero thresholding mechanism 50 of the present invention utilizes two decision thresholds to distinguish low versus high energy in the case of both negative and positive correlator outputs. The block diagram of FIG. 4 demonstrates the manner in which threshold comparisons are utilized to determine the contents on the sub-channel. If the absolute value (i.e., the sign bit is suppressed) of the correlator output exceeds a non-zero threshold, indicating that sufficient energy exists on the sub-channel for a bit decision to be made, then a true bit decision is made using the prescribed thresholds. If not, an indication is passed to the output of the non-zero thresholding mechanism 50 that indicates that the channel is idle.

During operation, the correlation output, which is represented by line 63, is passed to an absolute value determination component 65 and to a bit decision component 68. The absolute value component 65 determines the absolute value of the correlation output by suppressing the sign bit of the correlation output. The absolute value of the correlation output is then passed to an activity determination component 67. The activity determination component 67 determines whether or not sufficient energy exists on the sub-channel to indicate that a bit decision should be performed. The activity determination component 67 compares the absolute value to a non-zero threshold value, which may be, for example, 0.5 volts. If the absolute value exceeds the non-zero threshold value, then a bit decision is performed by the bit decision component 68.

If the activity determination component 67 determines that the absolute value is less than the non-zero threshold value, the activity determination component 67 outputs a value indicating that the sub-channel is idle, such as, for example, −5 volts. If the activity determination component 67 determines that the absolute value exceeds the non-zero threshold value, the activity determination component 67 outputs a value indicating that a bit decision is to be made. The bit decision component 68 then compares the correlation output with the positive and negative threshold values to determine whether or not a binary 1 or a binary 0 has been received.

If the bit decision component 68 determines that the positive threshold value has been exceeded, which is +0.5 volts in this exemplary scenario, the bit decision component 68 outputs a binary 1, which is passed to the receive buffer (not shown). If the bit decision component 68 determines that the correlation output is less than a negative threshold value, which is −0.5 volts in this exemplary scenario, the bit decision component 68 outputs a binary 0 to the receive buffer. The threshold values utilized by components 67 and 68 are equal in magnitude, but are not limited to any particular values.

It should be noted that the non-zero thresholding component 50 functions properly even when no asynchronous behavior is observed on the channel. The non-zero thresholding component 50 produces bit decisions as reliably as the aforementioned zero thresholding mechanism, provided that reasonable power control is maintained over the network. If reasonable power control is not maintained, low energy due to insufficient signal power could potentially be construed by the non-zero thresholding mechanism as an idle-channel condition.

Figure 5:
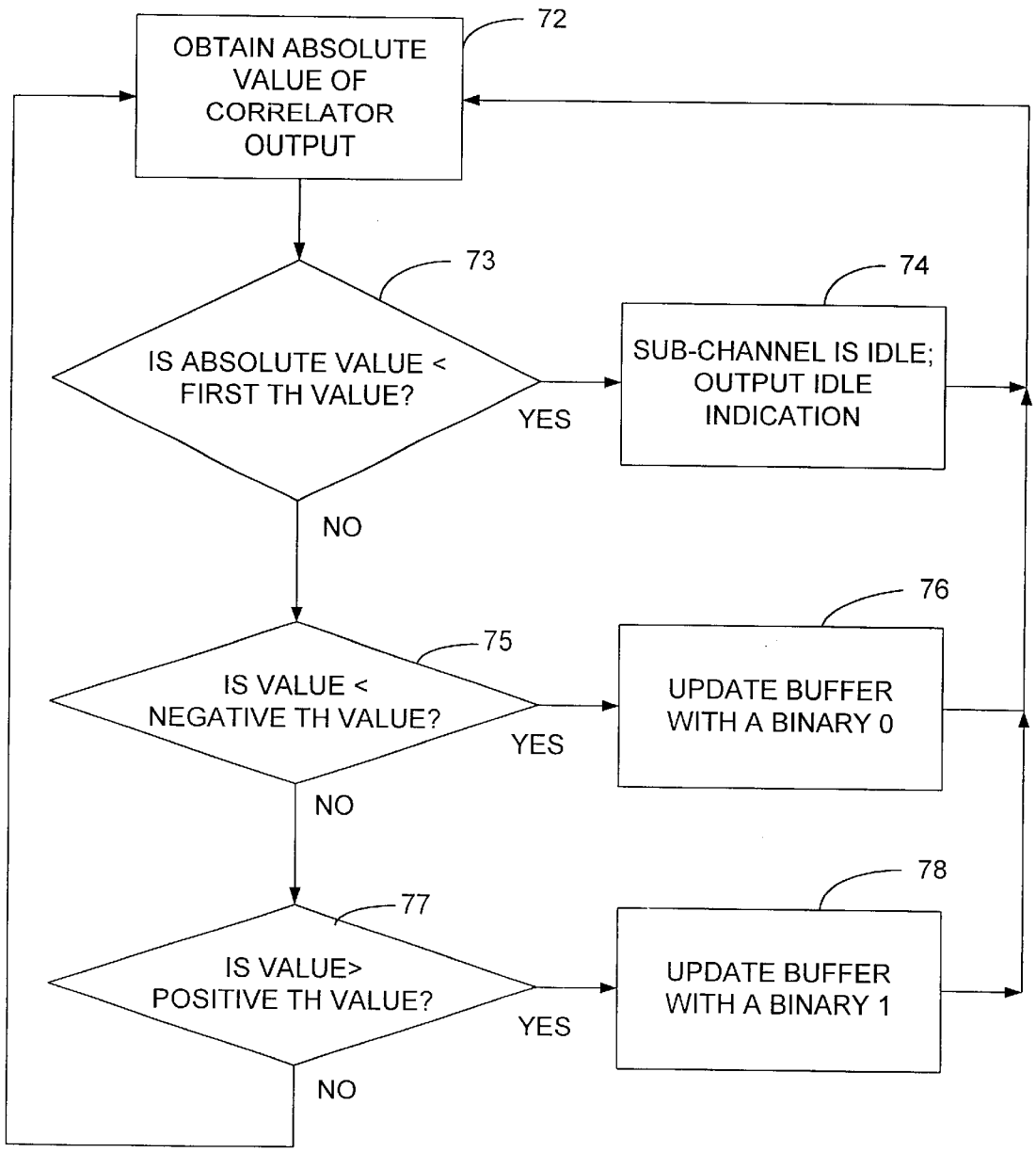
FIG. 5 is a flow chart illustrating the non-zero thresholding method of the present invention in accordance with the preferred embodiment.

FIG. 5 is a flow chart illustrating the non-zero thresholding method of the present invention in accordance with the preferred embodiment. It should be noted that the non-zero thresholding method of the present invention may be performed solely in hardware or in a combination of hardware and software, as will be understood by those skilled in the art. Those skilled in the art will understand that the present invention is not limited with respect to the manner in which the non-zero thresholding mechanism of the present invention is implemented.

FIG. 4 may be viewed as a hardware representation of the non-zero thresholding mechanism of the present invention, wherein electrical circuitry comprised in the modem performs the functions represented by blocks 65, 67 and 68 shown in FIG. 4. For example, one or more comparator circuits (not shown) may be utilized for performing the comparisons discussed above with reference to FIG. 4. Those skilled in the art will understand the manner in which comparator circuits may be implemented and utilized for this purpose. The flow chart shown in FIG. 5 may be viewed as a software representation of the non-zero thresholding mechanism of the present invention, wherein a computer, such as, for example, a microprocessor or an application specific integrated circuit (ASIC), executes a non-zero thresholding program that evaluates the correlation outputs to determine whether the sub-channel is idle or, alternatively, whether a binary 0 or a binary 1 has been received over the sub-channel. The functions performed by the method illustrated in FIG. 5 are identical to the functions performed by the block diagram illustrated in FIG. 4.

Referring to FIG. 5, the absolute value of the correlator output is obtained, as indicated by block 72. A determination is made at block 73 as to whether or not the absolute value of the correlator output exceeds a first threshold value. This first threshold value corresponds to the non-zero threshold value utilized by the activity determination component 67 in FIG. 4. If the absolute value of the correlator output is smaller than the first threshold value, a determination is made that the sub-channel is idle and the non-zero thresholding mechanism of the present invention outputs an indication that the channel is idle so that the receive buffer is not updated, as indicated by block 74.

If a determination is made at block 73 that the absolute value exceeds the first threshold value, then a determination is made at block 75 as to whether or not the value of the correlator output, taking into account the polarity of the correlator output, is less than a second, negative threshold value. If so, a binary 0 is output by the non-zero thresholding mechanism, which is then utilized to update the receive buffer, as indicated by block 76. If a determination is made at block 75 that the correlator output value is not less than the second, negative threshold value, then a determination is made as to whether or not the correlator output value, taking into account its polarity, is greater than a third, positive threshold value, as indicated by block 77. If so, the receive buffer is updated with a binary 1, as indicated by block 78.

The process is illustrated as returning from blocks 74, 76, 77 and 78 to block 72. This is simply intended to indicate that the non-zero thresholding mechanism of the present invention continues to evaluate the correlator outputs as decisions are made regarding the condition of the sub-channel.

It should be noted that the order in which the steps represented by blocks 75 and 77 are performed is not limited to the order shown in FIG. 5. For example, the step represented by block 77 could be performed before the step represented by block 75, but after the step represented by block 73. Those skilled in the art will understand that other modifications can be made to the method represented by the flow chart of FIG. 5, which are also within the scope of the present invention. It will also be understood by those skilled in the art that the present invention is not limited with respect to the threshold values utilized in the decision blocks 73, 75 and 77.

It should be noted that the present invention has been described with respect to preferred embodiments, but that the present invention is not limited to these embodiments. Those skilled in the art will understand that modifications can be made to the embodiments discussed above that are within the spirit and scope of the present invention.

What is claimed is:

1. An apparatus for evaluating signals received over a channel of a network, the channel utilizing a shared bandwidth for communication over the channel, each signal having a magnitude and a polarity, the apparatus comprising:

first logic, the first logic being configured to demodulate signals received over the channel, each demodulated signal having a polarity and magnitude;

second logic, the second logic receiving a signal demodulated by the first logic, the second logic being configured to determine an absolute value of the received demodulated signal, the absolute value of the demodulated signal corresponding to the magnitude of the demodulated signal;

third logic, the third logic receiving the absolute value from the second logic, the third logic being configured to compare the absolute value with a first threshold value to determine whether or not the channel is idle, wherein the third logic outputs a result indicating whether or not the channel is idle; and fourth logic, the fourth logic receiving the polarity and magnitude of the signal demodulated by the first logic and received by the second logic, the fourth logic being configured to perform a bit decision when the third logic has determined that the channel is not idle, the fourth logic evaluating the magnitude and polarity of the demodulated signal to determine whether the signal corresponds to a binary 0 or a binary 1, the fourth logic outputting either a binary 0 or a binary 1 in response to performing the bit decision.

2. The apparatus of claim 1, wherein if the third logic compares the absolute value with the first threshold value and determines that the absolute value is less than the first threshold value, the third logic outputs a result indicating that the channel is idle, and wherein if the third logic compares the absolute value with the first threshold value and determines that the absolute value is greater than the first threshold value, the third logic outputs a result indicating that the channel is not idle.

3. The apparatus of claim 2, wherein the fourth logic evaluates the magnitude and polarity of the signal by comparing the signal with a second, negative threshold value and with a third, positive threshold value, wherein if the fourth logic compares the signal with the second, negative threshold value and determines that the signal has a negative polarity and a magnitude that exceeds the magnitude of the second, negative threshold value, the fourth logic outputs a binary 0, and wherein if the fourth logic compares the signal with the third, positive threshold value and determines that the polarity of the signal is positive and that the magnitude exceeds the magnitude of the third, positive threshold value, the fourth logic outputs a binary 1, wherein the first, second and third threshold values are equal in magnitude.

4. The apparatus of claim 1, wherein the apparatus is comprised in a receiver of a modem of a communication device being utilized by a user in a wireless network.

5. The apparatus of claim 1, wherein the apparatus is comprised in a receiver of a modem operating in a network that utilizes a code division multiple access (CDMA) standard for communicating information over the network.

6. The apparatus of claim 1, wherein the network is a wireless local area network (LAN), and wherein the apparatus is comprised in a receiver of a modem being utilized to transmit information over the wireless LAN.

7. The apparatus of claim 3, wherein the fourth logic compares the signal with the second, negative threshold value before the fourth logic compares the signal with the third, positive threshold value.

8. The apparatus of claim 3, wherein the fourth logic compares the signal with the third, positive threshold value before the fourth logic compares the signal with the second, negative threshold value.

9. The apparatus of claim 1, wherein the first logic processes the demodulated signals to produce a correlation result, and wherein the demodulated signal received by the second and fourth logic corresponds to a correlation result.

10. A method for evaluating signals received over a channel of a network, the channel utilizing a shared bandwidth for communication over the channel, each signal having a magnitude and a polarity, the apparatus comprising the steps of:

demodulating a signal received over the channel, the demodulated signal having a polarity and magnitude;

determining an absolute value of the demodulated signal, the absolute value of the demodulated signal corresponding to the magnitude of the demodulated signal;

comparing the absolute value with a first threshold value to determine whether or not the channel is idle; and if a determination is made that the channel is not idle, performing a bit decision to determine whether the demodulated signal corresponds to a binary 0 or a binary 1.

11. The method of claim 10, wherein if, during the comparing step, a determination is made that the absolute value is less than the first threshold value, a result indicating that the channel is idle is generated, and wherein if, during the comparing step, determination is made that the absolute value is greater than the first threshold value, a result indicating that the channel is not idle is generated.

12. The method of claim 10, wherein the bit decision is performed by comparing the demodulated signal with a second, negative threshold value and with a third, positive threshold value, wherein if a determination is made that the signal has a negative polarity and a magnitude that exceeds the magnitude of the second, negative threshold value, a bit decision is made that the demodulated signal corresponds to a binary 0, and wherein if a determination is made that the polarity of the signal is positive and that the magnitude exceeds the magnitude of the third, positive threshold value, a bit decision is made that the demodulated signal corresponds to a binary 1, wherein the first, second and third threshold values are equal in magnitude.

13. The method of claim 12, wherein the demodulated signal is compared with the second, negative threshold value before the demodulated signal is compared with the third, positive threshold value.

14. The method of claim 12, wherein the demodulated signal is compared with the third, positive threshold value before the demodulated signal is compared with the second, negative threshold value.

15. A communications system for communicating signals over a network, the signals being communicated over a channel of the network, the channel utilizing a shared bandwidth for communication over the channel, each signal having a magnitude and a polarity, the system comprising:

a transmitter, the transmitter transmitting the signals over the network; and a receiver, the receiver receiving the signals transmitted by the transmitter, the receiver demodulating the signals received over the channel, each demodulated signal having a polarity and magnitude, the receiver determining an absolute value of the received demodulated signal, the absolute value of the demodulated signal corresponding to the magnitude of the demodulated signal, the receiver comparing the absolute value with a first threshold value to determine whether or not the channel is idle, wherein if the receiver determines that the channel is not idle, the receiver performs a bit decision by evaluating the magnitude and polarity of the demodulated signal to determine whether the signal corresponds to a binary 0 or a binary 1.

16. The system of claim 15, wherein if the receiver compares the absolute value with the first threshold value and determines that the absolute value is less than the first threshold value, the receiver determines that the channel is idle, and wherein if the receiver compares the absolute value with the first threshold value and determines that the absolute value is greater than the first threshold value, the receiver determines that the channel is not idle.

17. The system of claim 16, wherein the receiver evaluates the magnitude and polarity of the signal by comparing the signal with a second, negative threshold value and with a third, positive threshold value, wherein if the receiver compares the signal with the second, negative threshold value and determines that the signal has a negative polarity and a magnitude that exceeds the magnitude of the second, negative threshold value, the receiver determines that the signal corresponds to a binary 0, and wherein if the receiver compares the signal with the third, positive threshold value and determines that the polarity of the signal is positive and that the magnitude exceeds the magnitude of the third, positive threshold value, the receiver determines that the signal corresponds to a binary 1, wherein the first, second and third threshold values are equal in magnitude.

18. The system of claim 15, wherein the receiver is a receiver of a modem of a communication device being utilized by a user in a wireless network.

19. The system of claim 15, wherein the receiver is a receiver of a modem operating in a network that utilizes a code division multiple access (CDMA) standard for communicating information over the network.

20. The apparatus of claim 15, wherein the network is a wireless local area network (LAN), and wherein the receiver is a receiver of a modem being utilized to transmit information over the wireless LAN.

* * * * *